(No Model.) 2 Sheets—Sheet 1.
J. L. HART.
CORN HARVESTER.
No. 585,000. Patented June 22, 1897.
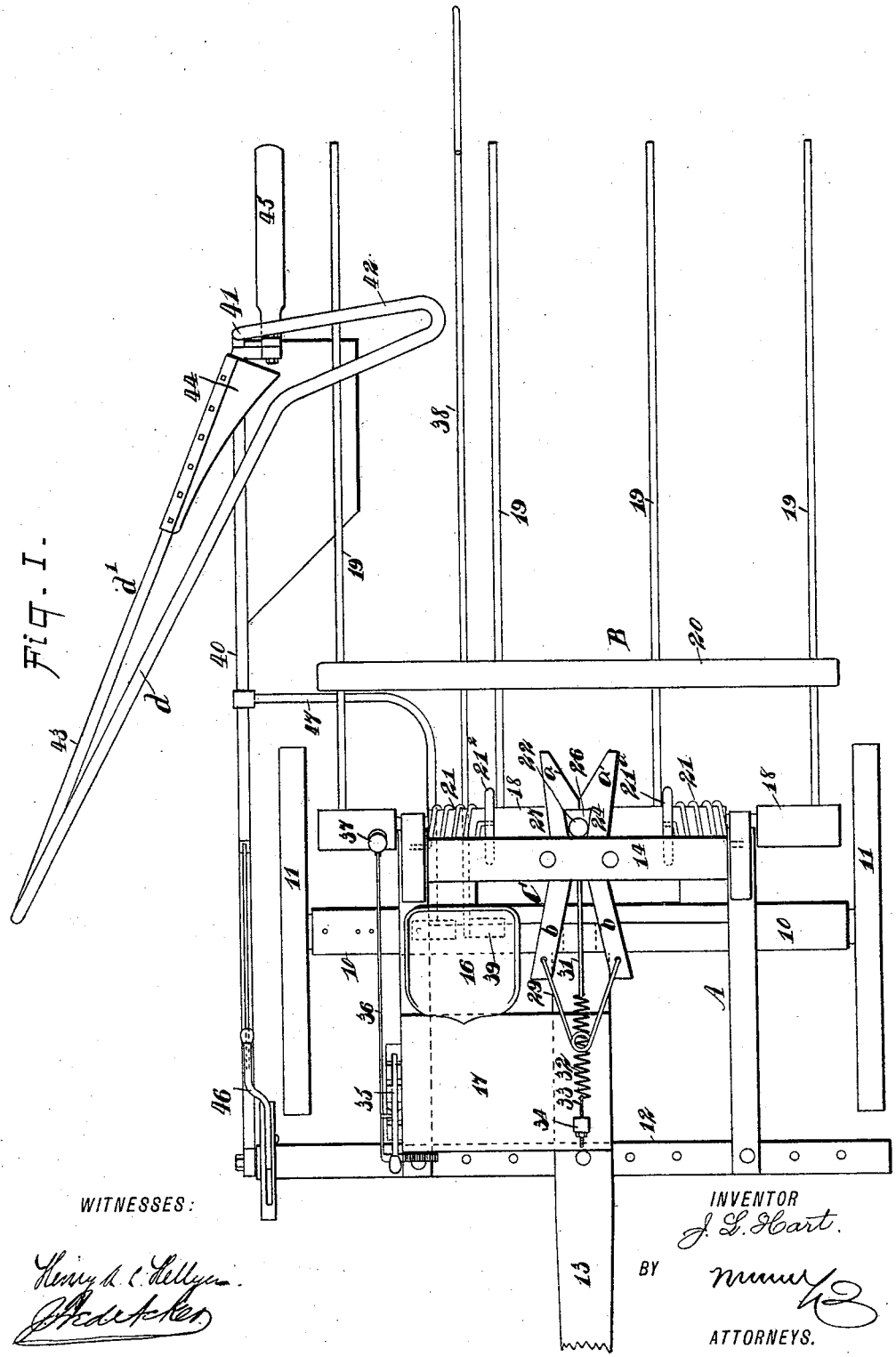
Fig. I.
WITNESSES:
INVENTOR
J. L. Hart.
BY
ATTORNEYS.

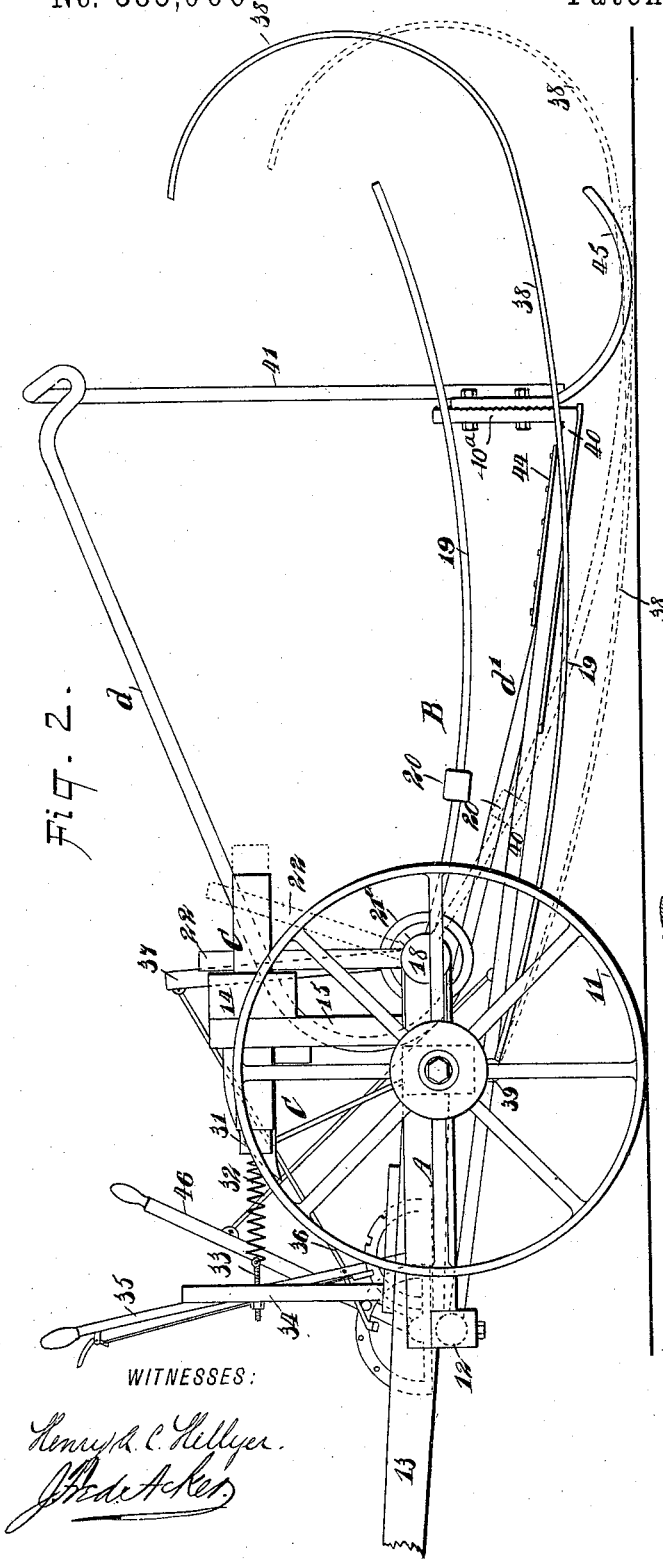

UNITED STATES PATENT OFFICE.

JAMES L. HART, OF GRENOLA, KANSAS.

CORN-HARVESTER.

SPECIFICATION forming part of Letters Patent No. 585,000, dated June 22, 1897.

Application filed March 31, 1896. Serial No. 535,553. (No model.)

*To all whom it may concern:*

Be it known that I, JAMES L. HART, of Grenola, in the county of Elk and State of Kansas, have invented a new and Improved Corn-Harvester, of which the following is a full, clear, and exact description.

The object of the invention is to provide a simple, durable, and economic corn-harvester and one which will be so constructed as to be self-acting or automatic in its operation of cutting the stalks, receiving the cut stalks on a dumping-platform, and dumping the stalks from said platform when a predetermined quantity has accumulated thereon.

A further object of the invention is to provide a corn-harvester in which there will be no necessity for gearing and which will also be provided with a device automatically acting to carry the stalks of corn when delivered from the dumping-platform out of the path of the supporting or ground wheels of the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a side elevation thereof, the deflecting-arm and dumping-platform being shown in dotted lines in their lower positions. Fig. 3 is an enlarged horizontal section through a portion of the frame, illustrating in plan view the locking-dogs for the dumping-platform. Fig. 4 is a detail view of a spring-controlled brace for the main directing-bar of the machine, and Fig. 5 is a detail sectional view of parts to be hereinafter described.

In carrying out the invention a frame A is employed, of any approved construction and mounted upon an axle 10, which axle carries suitable ground-wheels 11, and the front cross-beam 12 of the frame extends outward beyond the wheels 11 and is made in adjustable sections, so that the machine may be accommodated to rows of different widths. A tongue 13 is attached to the aforesaid front cross-bar of the frame. A head-block 14 is horizontally located at about the central rear portion of the frame, being supported by suitable standards 15, and the driver's seat 16 is located in front of the head-block, while a fixed platform 17 is placed in front of the driver's seat, as shown in Fig. 1.

A dumping-platform B is provided, which is attached to and carried by the wheel-supported frame A. This dumping-platform consists of a drum or roller 18, journaled in suitable bearings at the rear of the aforesaid frame, and a series of fingers 19, projected rearwardly from the drum 18, the fingers having an upward curve, as shown in Fig. 2, and they are connected and braced by a cross-bar 20.

The fingers 19 are preferably of spring-wire or a like material and are held normally a predetermined distance above the surface of the ground through the medium of springs 21, coiled around the drum 18 near its ends, the springs being attached to the frame or a fixed support independent of the drum, the opposite ends of the springs being secured to the drum, and in order that more or less tension may be exerted on these springs to maintain the platform a greater or a less distance from the ground wheels $21^a$ are loosely mounted on the drum, and the inner ends of the springs are attached to these wheels, which, after they have been turned to obtain the required tension on the springs, will be fastened firmly to the drum by means of pins or equivalent locking devices.

The drum 18 extends as near as possible to the inner faces of the supporting-wheels 11, and from the central portion of this drum a locking-bar 22 is upwardly projected, and the said locking-bar is normally held in a vertical position by latch-dogs C, located in or upon the head-block 14. The latch-dogs are shown in detail in Fig. 3, in which it will be observed the dog comprises two opposing arms or members 23 and 24, adapted to slide and likewise to find a fulcrum in a longitudinal slot 25, made in the head-block. The arms or members of the dog extend forwardly and rearwardly beyond the head-block, and at the rear end of each member a head $a$ is formed, the opposing edges of the heads being inclined in direction of each other and likewise in direction of the front, and each head extends at its forward or wider end inwardly beyond the inner edge of the member to which it belongs, the inner edge of each head at its wider or forward portion being preferably made straight, so that the corresponding straight portions of the two heads may be brought together, which position they normally occupy, by connecting the handle portions *b* of the said members of the dog which extend in direction of the front by a spring 29.

Owing to the enlargement of the rear portion of the heads of the members of the dog a space or a pocket 26 is formed, into which the locking-bar 22 of the dumping-platform is received when the said platform is in its normal position. The members of the dogs are pivoted in the head-block by forming shoulders 28 at or near the central portions of their outer edges and passing pins 27 through the openings 25, in which the dog is located, to an engagement with the said shoulders, as is likewise shown in Fig. 3, and the outer edges of the handle portions of the said members are so shaped that the dog may be drawn rearward a predetermined distance, but cannot pass forwardly after their shoulders 28 are in engagement with the said pins 27.

In order to prevent one member of the locking-dog being drawn outward from its seat before the other member, the two members are connected at or near their point of fulcrum by a pivotally-connected link 30, and this pin also serves to secure one end of a link 31, which is carried forward and attached to a spring 32, the forward end of the spring being preferably secured to an adjusting-screw 33 or a suitable tension device located upon an upright 34, supported on the frame A of the machine, so that whenever the dog is drawn rearward, which will happen when the platform B is to be dumped, the spring 32 will be placed under tension, and after the locking-bar 22 of the dumping-platform has escaped from the dog the spring 32 will return the dog to its normal position.

Preferably the springs controlling the dumping-platform are of such strength that they will hold the dumping-platform in its receiving position until a predetermined weight of stalks is contained on the platform, whereupon the weight of the said stalks will overcome the resistance of the springs 21 and will draw rearwardly the locking-bar 22 of the platform, causing the said bar to carry the dog 33 with it to a certain extent, as shown in dotted lines in Fig. 2, placing the spring 32, controlling the dog, under tension, and when the spring 32 acts to arrest the rearward motion of the dog the locking-dog of the platform will force its way out from between the members of the dog, permitting the platform to strike the ground at its rear end and discharge its load. The dog having returned to its normal position, the platform freed from its load will be drawn upward by the springs 22, and the locking-bar of the platform will once more be forced automatically into its locking engagement with the dog. The object of the dog is to require that the platform shall be loaded with more weight before dumping than would be sufficient to overcome the resistance of the springs 21, controlling the platform, thereby causing the dumping action of the platform to take place gradually.

If the springs are not employed for producing the dumping action of the platform B, the platform may be raised and lowered through the medium of a lever 35, fulcrumed on the frame A, being connected by a link 36 with a post 37, secured to the drum 18 of the dumping-platform at or near one of its ends.

Ordinarily when cornstalks are dumped from the rear portion of a machine the stalks are brought into the path of the wheels when the next row of standing cornstalks is to be cut. In other words, the stalks will stand transversely with respect to the machine. In order to prevent such a distribution of the cut stalks, I provide a deflecting-arm 38, which is ordinarily made of a spring material—as, for example, stout wire—and is located nearer the right-hand side of the machine than the left-hand side. This arm is upwardly curved at its rear end and extends some distance rearwardly beyond the terminals of the platform-fingers 19.

The inner end of the deflecting-arm is preferably attached to a drum or roller 39, which may be journaled below the axle, and a spring is also usually employed to normally hold the deflecting-arm a certain distance above the ground, yet nearer thereto than the dumping-platform, beneath which it is located, as shown in Fig. 2. When the stalks are discharged from the dumping-platform, they will be received by the curved portion of the deflecting-bar at a point between their centers and one of their ends, so that as the machine advances the stalks will be turned around so as to stand longitudinally with respect to the machine and with their cut ends pointing toward the machine. Under such a construction the cut stalks will in no manner interfere with the action of the machine while in the field.

At the right-hand side of the machine a directing-bar 40 is pivoted at its forward end to the right-hand end of the front cross-bar 12 of the frame. This directing-bar extends rearwardly to a point between the center of the dumping-platform and its rear end. The directing-bar is then bent upon itself and carried upward, forming a vertical standard 41, and the bar is next bent upon itself to form a horizontal tapering guide-finger 42, which will extend horizontally over the dumping-platform a predetermined distance, and preferably the forward face of the said guide-finger 42 is given an inclination from the right-hand side of the machine inwardly and rearwardly, so as to throw and direct the cut stalks over upon and across the dumping-platform B. After the guide-finger 42 is formed the material of which the finger is constructed is carried forwardly and outwardly beyond the right-hand side of the machine and is again returned to the rear end of the main directing-bar 40, or where the said bar connects with the upright 41, providing thereby an outer guide-finger 43, which is at an angle to the directing-bar 40, the outer finger comprising an upwardly and downwardly inclined member $d$ and a lower substantially straight member $d'$, and the two members are not in vertical alinement, the upper member being nearer to the right-hand side of the machine. A knife 44 is secured upon the rear end portion of the lower member $d'$ of the outer guard-finger 43, and the corn to be cut is received between the directing-bar and the outer guard-finger, and owing to the position of the two guard-fingers relative to each other the tops of the stalks before they are cut will be inclined in direction of the dumping-platform.

When a stalk reaches the knife 44, the upper portion of the stalk will be inclined over the dumping-platform and the lower portion of the stalk will have been directed to and held against the knife by the inner portion of the directing-bar, the knife crossing the said directing-bar at that point. A shoe 45 is adjustably attached to an extension $40^a$ at the rear of the adjusting-bar 40, the shoe being adapted to hold the cutting and directing mechanism just described a predetermined distance from the ground. Fig. 5 shows the manner of attaching the shoe. The extension $40^a$ and the shank of the shoe are formed with registering corrugations and slots, bolts being passed through the slots and serving to clamp the parts together. This cutting and directing mechanism may be elevated when necessary through the medium of a lever 46, located on the frame of the machine and attached to the directing-bar. The directing-bar is prevented from being sprung laterally through the medium of a brace 47, which extends inward beneath the dumping-platform, and thence beneath the axle, as shown in Fig. 4, the inner end of the brace having a collar 48 formed thereon, held to loosely slide upon a fixed shaft 49, held in a bracket 50, secured to the bottom of the axle, and springs 51 and $51^a$ are located at opposite sides of the said collar 48, being coiled around the fixed shaft 49. Thus it will be observed that the directing-bar, and consequently the entire cutting and directing mechanism, may have a certain amount of lateral movement.

The machine may be attached to a lumber-wagon or to a similar vehicle, if desired, in which event the cross-bar 12, with which the cutting and directing apparatus are attached, will be fastened to the under side of the wagon-bed just in front of the hind wheels and the dropping mechanism will be attached to the lower end of the wagon-bed, the dogs or other fastening devices being best attached to the end-gate of the wagon.

Having thus described my invention, I claim as new and desire to secure by Letters Patent—

1. In a corn-harvester, a dumping-platform carrying the corn and moving downward to discharge the corn, and a finger arranged to engage the cut stalks when discharged from the platform, the said finger extending beyond the dumping-platform and having its rear end upwardly curved, as and for the purpose specified.

2. In a harvester, a dumping-platform adapted to be lowered into proximity with the ground, a deflecting-finger carried by the harvester and extending beyond and below the rear end of the dumping-platform at one side of the center of the same, the rear end of the deflecting-arm being upwardly curved, whereby the curved portion of the deflecting-arm receives the discharged stalks at a point between their centers and one end, changing the position of the said stalks so as to lie substantially parallel with the path of the machine, as and for the purpose specified.

3. The combination, with a wheeled support and a dumping-platform, of a directing-bar located at one side of the platform, having pivotal engagement with a support and terminating at its rear end in an upright, a bifurcated horizontal guard-finger projected from the upright over a portion of the platform, a gathering-finger of angular shape extending forwardly beyond the outer side of the directing-bar, the said gathering-finger comprising an upper downwardly-inclined member and a lower substantially straight member, the latter being returned to the aforesaid standard, the upper member being carried inwardly of the lower member, a knife secured to the lower member of the gathering-finger and extending over the directing-bar, an adjustable shoe located at the rear end of the directing-bar, and means, substantially as described, for raising and lowering the said bar, as and for the purpose specified.

4. A harvester having a frame, two pins carried by the frame, a dumping-platform also carried by the frame, two dogs located between the pins, each dog having a head, the two heads coöperating to normally hold the dumping-platform and each dog also having a shoulder respectively engaging the pins and each dog also having a handle portion, the handle portions projecting away from each other and the dogs having longitudinal movement between the pins whereby to move the handle portions together and disengage the heads of the dogs, and means for spreading the handle portions of the dogs and for drawing the dogs in the direction of their handle portions, substantially as described.

5. A harvester having a directing-bar running longitudinally at one side of the machine, a standard extending from the rear portion of the directing-bar, a guide-finger running inward from the standard, and a second guide-finger extending forwardly and outwardly and forming a continuation of the first guide-finger, the second guide-finger having an upper member downwardly inclined and the second guide-finger also having a lower member running rearwardly, and a knife carried by the rear portion of the lower member, substantially as described.

6. The combination with a frame, of a dumping-platform pivotally connected thereto, two dogs each having a head, the two cooperating to hold the dumping-platform raised, a spring actuating the dog to engage their heads with each other, two pins between which the dogs are movable, a handle portion for each dog, the handle portions being outwardly diverged so that as they move between the pins the heads of the dogs will be separated, and yielding means for drawing the dogs in the direction in which their handle portions project, substantially as described.

7. The combination with a frame having an opening, a dumping-platform pivotally connected to the frame, two dogs slidably mounted within the opening of the frame and normally holding the dumping-platform raised, a handle portion for each dog, the handle portions being diverged and engaging the sides of the opening to separate the heads of the dogs as the dogs move in the opening, means for spreading the handle portions of the dogs, and yielding means for drawing the dogs in the direction of their handle portions, substantially as described.

8. The combination with a frame, of a dumping-platform pivoted on the frame, two spring-actuated dogs slidable in an opening in the frame and normally holding the platform raised, each dog having an outwardly-extending handle portion adapted to engage the opening in the frame to cause the dogs to release the dumping-platform, and means for yieldingly holding the dogs in position to prevent the engagement between the handle portions and the opening of the platform, substantially as described.

9. The combination with a frame having an opening therein, of a dumping-platform pivoted to the frame, a locking-bar connected to the dumping-platform, two pins located within the opening of the frame, two dogs movable between the pins in the opening, each dog having a head normally engaging the locking-bar, and also having a shoulder respectively normally engaging the pins, and each dog also having a handle portion, the handle portions being diverged from each other, a spring tending to spread the handle portions, and a spring yieldingly holding the shoulders of the dogs engaged with the pins, substantially as described.

JAMES L. HART.

Witnesses:
ABRAM YATES,
GEO. L. DICKIE.